United States Patent
Chernov et al.

(10) Patent No.: US 11,220,375 B2
(45) Date of Patent: Jan. 11, 2022

(54) INTEGRATED SQUEEZABLE DISPENSING CONTAINER

(71) Applicant: Klecher, LLC, Brooklyn, NY (US)

(72) Inventors: Yuriy Chernov, Brooklyn, NY (US); Gennady I. Kleyman, Brooklyn, NY (US)

(73) Assignee: KLECHER, LLC, Brooklyn, NY (US)

( * ) Notice: Subject to any disclaimer, the term of this patent is extended or adjusted under 35 U.S.C. 154(b) by 0 days.

(21) Appl. No.: 16/448,886

(22) Filed: Jun. 21, 2019

(65) Prior Publication Data

US 2020/0102123 A1 Apr. 2, 2020

Related U.S. Application Data

(63) Continuation of application No. 15/889,985, filed on Feb. 6, 2018, now Pat. No. 10,377,533, which is a continuation-in-part of application No. 15/169,899, filed on Jun. 1, 2016, now Pat. No. 9,919,847.

(51) Int. Cl.
| | |
|---|---|
| *B65D 35/28* | (2006.01) |
| *B65D 35/14* | (2006.01) |
| *B65D 35/04* | (2006.01) |
| *B32B 3/08* | (2006.01) |
| *B32B 1/08* | (2006.01) |

(52) U.S. Cl.
CPC ............... *B65D 35/28* (2013.01); *B32B 1/08* (2013.01); *B32B 3/08* (2013.01); *B65D 35/04* (2013.01); *B65D 35/14* (2013.01); *B32B 2439/40* (2013.01); *B65D 2255/20* (2013.01)

(58) Field of Classification Search
CPC ........ B65D 35/18; B65D 35/28; B65D 35/32; B65D 35/04; B65D 35/14; B65D 2255/20
USPC .......................................................... 222/103
See application file for complete search history.

(56) References Cited

U.S. PATENT DOCUMENTS

| | | | |
|---|---|---|---|
| 2,980,963 A | 4/1961 | Makowski | |
| 3,211,342 A * | 10/1965 | De Wayne Miles ... | B65D 35/18 222/107 |
| 4,448,333 A | 5/1984 | Ferrari | |
| 4,579,254 A * | 4/1986 | Puskarcik .............. | B65D 35/28 222/103 |
| 4,733,800 A | 3/1988 | Bjorkengren | |

(Continued)

FOREIGN PATENT DOCUMENTS

| | | | | |
|---|---|---|---|---|
| WO | WO90/08072 | * | 7/1990 | ............. B65D 25/32 |
| WO | WO 2012/055353 | | 5/2012 | |

*Primary Examiner* — J C Jacyna
(74) *Attorney, Agent, or Firm* — Haley Guiliano LLP

(57) ABSTRACT

An elongated tubular housing adapted to receive an adjustable external compression device introduced on one end of the tubular housing distal from the opening releasing the contents, and retained in position by a member engaging a grooved strip that is integrated with and/or retained on the housing surface material with a strip surface of like material, providing a reliable, economic and functional outer compression member retention apparatus and method. Further embodiments according to the present invention include a dispenser having regions provided for ease and comfort of gripping, grooved strip end-stop to retain compression device, and grooved strip dimensional and placement details to provide functional, manufacturable and economic material dispenser.

17 Claims, 5 Drawing Sheets

(56) References Cited

U.S. PATENT DOCUMENTS

| | | | |
|---|---|---|---|
| 5,238,148 A * | 8/1993 | Holoubek | B32B 27/08 |
| | | | 222/23 |
| 5,322,658 A | 6/1994 | Holoubek | |
| 6,302,298 B1 * | 10/2001 | Chernov | B65D 35/28 |
| | | | 222/103 |
| 6,851,577 B2 | 2/2005 | Kleyman | |
| 8,517,218 B2 | 8/2013 | Chernov | |
| 8,783,515 B2 | 7/2014 | Branyon | |
| 8,827,114 B2 | 9/2014 | Scott | |
| 9,919,847 B2 * | 3/2018 | Kleyman | B65D 35/28 |
| 10,377,533 B2 | 8/2019 | Kleyman | |
| 2005/0029294 A1 * | 2/2005 | Jackson | B65D 35/18 |
| | | | 222/95 |
| 2007/0194044 A1 * | 8/2007 | Chernov | B65D 35/28 |
| | | | 222/103 |
| 2013/0232904 A1 * | 9/2013 | Drake, III | E04F 19/083 |
| | | | 52/582.2 |

* cited by examiner

INTEGRATED SQUEEZABLE DISPENSING CONTAINER

CROSS-REFERENCE TO RELATED APPLICATIONS

This is a continuation of U.S. patent application Ser. No. 15/889,985, filed Feb. 6, 2018, which is a continuation-in-part of U.S. patent application Ser. No. 15/169,899 filed Jun. 1, 2016, the disclosure of which are hereby incorporated by reference herein in their entireties.

FIELD OF THE INVENTION

The preset invention relates fluid or semi-fluid material containers formed to provide selective material dispensing, in particular, to deformable fluid containers including structure that maintain deformation after selective dispensing.

BACKGROUND OF THE INVENTION

Deformable material dispensing containers, typically tubular or other shaped housings having an openable restriction (e.g. Cap, such as a flat style, a fez style or a pedestal style) at one end and being sealed at the other end, include material therein that can be displaced through the openable restriction when the material dispenser (e.g. the 'tube') is deformed, such as by squeezing, which temporarily diminishes the volume of the housings to urge the contained included material out through the openable restriction. However, owing to the housing material and/or geometrical configuration, the housing tends to return to the original configuration or volume, delaying or interfering with subsequent dispensing of the included material.

Additionally, during a squeezing action, some portion of materials will be displaced in opposite of opening direction and create necessity to make a more refined or controlled squeezing action necessary to push those materials to the tube opening.

External dispenser compression devices applied to the housing distal from the openable restriction to maintain prior housing deformations require specific modification or construction of the housing to connect to and operate which may undesirably raise the costs, complexity and/or formation of the housing to receive external devices or use housings (e.g. tubes) currently commercially available.

A wide variety of devices have been suggested and provided for the purpose of holding in a collapsible tube, a fluid or cream-like material such as a tube of toothpaste, and gradually and controllably dispensing the contents. These devices range from a simple slotted key, to ceramic rollers, to elaborate geared contraptions.

These devices generally operate with a channel receiving a tube of toothpaste or the like and provided with a means for supporting the tube so as to progressively dispense the contents of the tube. Collapsible containers or tubes typically have flat back ends and provided with an annular cross-section terminating with a relatively narrow neck, which is fitted with a screw-on cap or other such closure. When the cap is removed, the open end of the neck serves as an outlet for the product discharged from the tube for application in the ordinary course of its use. Many such tubes are made from a pliable plastic material, which one can squeeze by hand to force product out. Usually the wall thickness of plastic tubes is between 400 and 650 microns. These tubes usually do not hold their deformed configuration once the externally applied pressure is released, but rather spring back to approximately their original shape and condition.

Other containers or tubes are laminates typically consist of multiple layers of foils (aluminum) or films that are united by extrusion or adhesive lamination. The middle film or aluminum foil is usually the barrier layer. It prevents components of the medium from escaping from the tube. It also prevents critical substances that could influence or change the products (such as oxygen) from the environment from entering into the tube. Interior and exterior films of the laminate tubes ensure sealability, printability and the necessary properties with respect to the product. Currently processes laminates in thicknesses between 250 and 400 microns.

For those tubes, which spring back to their approximate original shape, the product they contain can once again spread out over the full volume of the tube. As the contents are used up and removed from the tube, the small amount remaining in the tube can be hard to dispense by the usual method of applying finger pressure.

Similarly, in cases where the tubes remain deformed, pockets of cream products may be scattered throughout the tube. Again, this unwanted, sporadic accumulation of the product to be discharged prevents the latter from being fully squeezed out of the tube, if a regular finger pressure is used.

Some attempts have been made previously to provide mechanical devices, which can apply greater force, or more evenly distribute the force applied, than is possible using one's fingers only. For example, U.S. Pat. No. 3,326,420 discloses the tube, secured within a channel by means of its flat end, and a slide progressively engaging the tube to empty its contents. The structure of this patent may have certain disadvantages associated with a substantial amount of material remains trapped at a conically shaped end of tube. It is necessary, thus, that the user provide an additional force to further squeeze the remaining material out of the tube.

Furthermore, the prior art dispensing arrangements may have limited flexibility with regard to the number of sizes of packages that could be used in a particular device, as disclosed in U.S. Pat. No. 6,302,298, commonly owned with and fully incorporated by reference herein. This invention describes a flexible wall of tube has a plurality of depressions and projections arranged in the longitudinal direction and squeezing mechanism engage with those wall depressions and projections. Wall thickness of laminated tubes is 250-400 microns and wall thickness of plastic extruded tube is 400-650 microns and create those depressions and projections on thin wall like this with ability to engage with squeezing mechanism and protect squeezing mechanism from displacement during tube squeezing is impossible.

Furthermore, the prior art dispensing arrangements may have limited flexibility with regard to the number of sizes of packages that could be used in a particular device, as disclosed in U.S. Pat. No. 8,517,218 which is commonly owned with and fully incorporated by reference herein, and describes a dispenser for delivery substance from container consist a reusable track extended between front and rear end of the container and this track detachably adhered to the container and slider, in direct contact with container, detachably coupled to the track. When a squeezing action is applied to tube (with a transvers 'pusher') to squeeze out the substance from the tube, pressure from this action will translate from slider to track "tooth" and because track detachably adhered to container wall in order to re-use the track, and the track will be removed off from container wall and track and slider will separate from container. Accordingly, it is not desired to make a strong or permanent track adherence to the container wall to allow track separation from container. To ensure engagement between track "tooth" and the pusher having a member that engages the track tooth, a precise relationship is needed between track and pusher, which is difficult to attach this track to another container by user with this required precision.

According to another U.S. Pat. No. 4,733,800 a strip, laminate including metal foil and at least one metal foil layer within a plastic material forming the tube to which the strip is attached, and this strip provides a 'dead-fold' (i.e. no mechanical memory to return to the unfolded state) characteristics. The thickness of this metal foil strip is between 40 to 200 microns to provide dead-fold characteristics, and width of said strip being less than the circumference of said tube and the thickness of the metal foil of the tubular body being within the interval of 5 to 40 microns. According to this patent, the metal and plastic strip can provide a dead-fold characteristics only to laminated tubes (including a metal strip) and this strip cannot be used with extruded plastic tubes. Moreover, this strip cannot prevent material squeezing in a direction opposite from the tube opening, because width of the toothless, simple strip being less than the circumference of said tube and will leave part of the tube with thin wall. Additionally, squeezing action will be more difficult, because strip with thicker metal foil makes the resulting tube structure more rigid.

It is desirable to have an integrated container laminated or extruded from plastic to be able to prevent (during squeezing action) some portion of tube internal materials to be displaced in opposite of opening direction and thus require additional squeezing action to push those materials to the tube opening. It is desirable flexible and a single layered strip longitudinally and permanently attached to container outer surface in position to provide a reliable engagement between pusher and the strip teeth.

SUMMARY OF THE INVENTION

The present invention provides embodiments which provide and adjustable external compression device introduced on the housing distal from the opening releasing the content, and retained in position by engaging a grooved strip integrated with and/or retained on the housing surface material with a strip surface of like material, providing a reliable, economic and functional outer compression member retention apparatus and method.

The inventive dispenser meets these by objectives by providing a flexible plastic strip with teeth, permanently attached to tube surface in position, to insure reliable engagement with pusher to act as ratchet and pawl mechanism, to prevent pusher to move in opposite direction from the tube opening during squeezing action. During squeezing action force will be translated to the pusher "lip" engaged with strip "teeth" to stay in this position to prevent pusher from displacement. That is why strip must be permanently attached to the tube surface to avoid disengagement strip from tube surface. This force will be grater if material in tube will be thicker or size (diameter) of the tube bigger Pusher will prevent squeezing out material to move in opposite direction from the tube opening during tube squeezing. Flexible plastic strip can be permanently attached to laminated or extruded tube surface by welding or by permanent glue. Flexible plastic strip with teeth will not make tube structure more rigid and harder to squeeze.

One of the advantages of the invention is that it can be used with a variety of differently shaped and sized collapsible containers laminated or extruded. Still another advantage of the inventive container is that the slider of the dispenser is provided with a configuration and dimension ensuring uniform contact with the outer periphery of the collapsible container during displacement of the slider. A further advantage of the present invention is that flexibility of the attached plastic strip does not make the tube stiffer and does not increase the force required for squeezing out material.

Furthermore, a ratchet mechanism provided on the inventive assembly can help handicapped users in dosing the squeezable material in accordance with either prescribed dosage or desired dosage. The users can sense a desired dosage because of sound or increase in resistance to the displacement of the slider along the frame.

Embodiments according to the present invention include a dispenser having regions provided for ease and comfort of gripping, grooved strip end-stop to retain compression device, and grooved strip dimensional and placement details to provide functional, practically manufacturable and economic material dispenser.

BRIEF DESCRIPTION OF THE DRAWING

These and further details of the present invention will be better understood by reading the following Detailed Description, taken together with the Drawing, wherein.

DETAILED DESCRIPTION

The following definitions will aid in the understanding of the embodiments.

82—a pusher metal lip, that can be pressed into the pusher or over-molded by the pusher member in an alternate embodiment of the invention

84—a longer strip, attached practically the all tube length, in an alternate embodiment "W"—the strip width "W-P"—width of pusher cut out, to receive a strip to be guided by a permanently attached strip The gap between "W" and "W-P" should be minimal, and preferably in the range from +0.003" to +0.005".

"S"—the width of pusher opening for a container tube, that should be bigger than width of flattened tube "T"—height of pusher cut out for thickness of the flattened tube "H" is a high of a strip "H-P" is a high of pusher cut out to receive strip, and is typically larger than "H" to allow pusher forward movement without interference with strip, preferably between 0.05" to 0.015"

Figure 1:
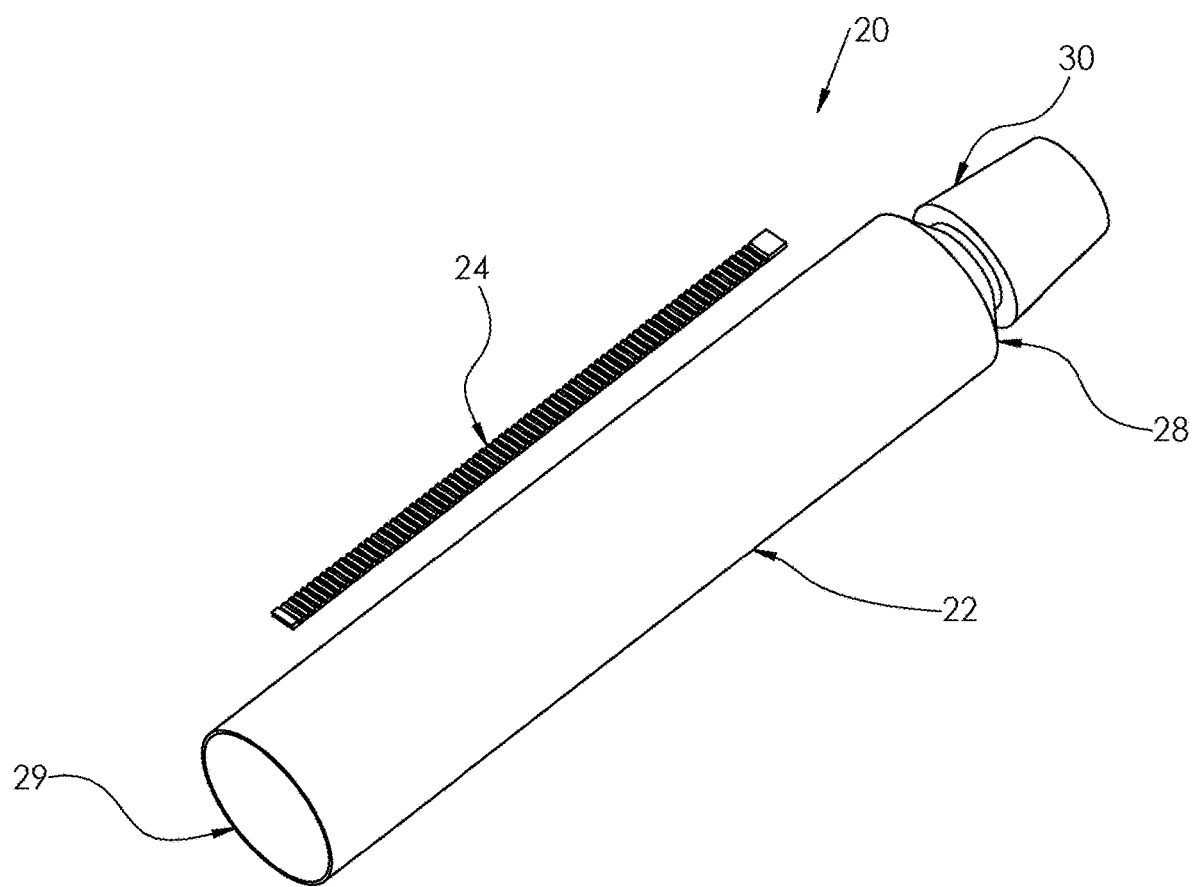
FIG. 1 is an exploded perspective view of container according to one embodiment of the present invention, without material inside, with unattached grooved strip.

An exemplary deformable (squeezable) material dispensing container 20 is shown in FIG. 1, wherein a tubular housing container 22 having a length and a prepared region disposed therealong to receive and be bonded to an elongated grooved or otherwise varied surface strip 24 which extends along the length of the housing container 22 toward an end 28 having an opening, e.g. an extension and mating removable cap 30, thereon through which material contained within the housing container is dispensed when the housing 22 is compressed. The elongated grooved strip 24 is shown as bonded to the tubular container 22 in FIG. 5.

Figure 2:
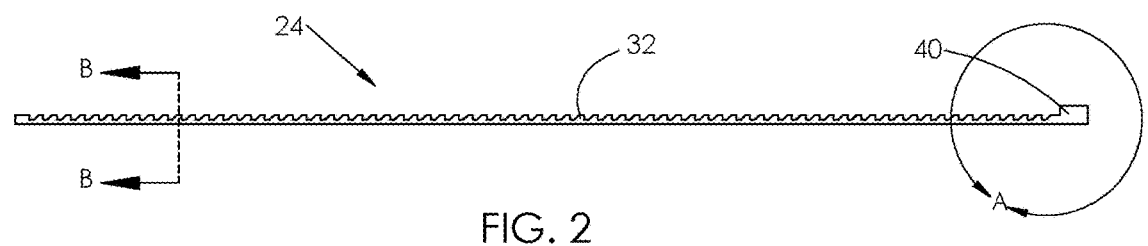
FIG. 2 is a side view of one embodiment of the grooved strip.
Figure 3:
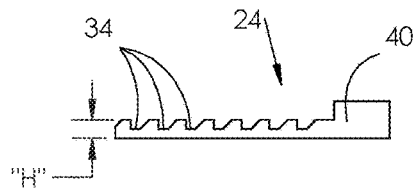
FIG. 3 is an enlarged view A taken from the grooved strip of FIG. 2.

A side view of an exemplary strip 24 is shown in FIG. 2, which strip 24 provides an engagement surface shown including raised portions, or teeth 32 with which a compression member 70 (FIG. 5) engages, wherein the engagement surface is varied, such as the periodically spaced grooves 34 shown in profile in FIG. 3. Other engagement surfaces are envisioned as may engage and retain the compression member 70. The strip 24 includes a terminal stop 40 having a greater thickness (i.e. vertical in FIGS. 2 and 3) dimension to engage and impede further motion of the compression member 70 along the strip 24. Typically the material 46 engaging 15 the compression member 70 is selected for suitable strength and the material 42A is selected to be compatible with the selected form of bonding to the prepared region.

Figure 4:
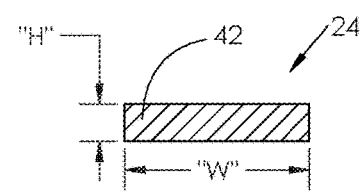
FIG. 4 is a cross-section B-B from strip of FIG. 3 comprising a single (mono-) material grooved strip.

The invention provides a flexible plastic strip 24 (one layer) with teeth 32, permanently attached to tube surface in position, to insure reliable engagement with pusher to act as ratchet and pawl mechanism, to prevent the pusher 70 to move in opposite direction from the tube 28 end having an opening during squeezing action. During squeezing action force will be translated to the pusher "lip" or protrusion 82, 74 engaged with strip "teeth" 32 to stay in this position to guide the pusher 70 from displacement along the strip 24. That is why strip 24 must be permanently attached to the tube 22 surface to avoid disengagement strip from tube surface. This force will be grater if material in tube will be thicker or size (diameter) of the tube bigger Pusher will prevent squeezing out material to move in opposite direction from the tube opening during tube squeezing. Flexible plastic strip can be permanently attached to laminated or extruded tube surface by welding or by permanent glue. Flexible plastic strip with teeth will not make tube structure more rigid and harder to squeeze and can be fabricated by molding or extrusion from polyethylene or nylon or similar plastic materials. The elongated strip 24 typically comprises a material 42, shown in cross-section in FIG. 4, compatible with bonding (e.g. ultrasonic welding, glue or fabricated by co-extrusion) to the housing container prepared region, of a single type which includes a material e.g. polyethylene, compatible with bonding (e.g. ultrasonic welding) one surface to the housing container 22 prepared region with which the compression member 70 engages, either directly or with an interposed bonding material 44, e.g. an adhesive resin such as ethylene copolymers produced by DuPont Corporation, where the stop 40, if provided, would be would be included in or formed on the surface material 46. Typically the material of strip 24 engaging the compression member 70 has suitable strength, and is selected to be compatible with the selected form of bonding to the prepared region along the length of the tubular container 22.

Welding of two plastic components 22, 24 according to industry standards can be done by using for example an ultrasound welding process. Ultrasonic welding of thermoplastics causes local melting of the plastic due to absorption of vibrational energy along the joint to be welded. The ultrasonic energy melts the point contact between the parts, creating a joint, and press, usually a pneumatic or an electric drive, to assemble two parts under pressure. Welding of two plastic components according to industry standards can be done by ultrasonic welding that causes local melting of the plastic due to absorption of vibrational energy supplied to the joint to be welded. The ultrasonic energy melts the point contact between the parts, creating a joint while the parts are under compression.

To make a reliable joint, melting points of two joint parts 22, 24 should be the same or very close e.g. in the range of ±10 degree C. That is why preferable arrangement for welding between two plastic components is that they should be made from the same materials or from materials with the same or close to the same melting point. Embodiments of the present invention can include containers comprising a single material and having substantially the same material melting temperature and/or substantially the same type of material, e.g. plastic devoid of metal.

Embodiments of the present invention can include containers 22 comprising a single material, as an extruded tube, for example polyethylene and strip 24 made from same material, for example polyethylene or from material with close melting point or container 22 can be multilayer laminated tube with outside polyethylene layer and strip 24 made from same material, polyethylene or from material with a melting point close to the melting point of the outer surface of the container tube 22.

When melting the same materials or materials with the same or close to the same melting point they melt at the same time and with pressing together by an external press, the melted materials from each joint parts penetrate into each other, and when cooled, each materials solidifies and creates a reliable joint therebetween. If each melting point of two components different, one part with lower melting point will be melt and another material, with sufficiently higher melting point will be still solid and those two parts cannot be integrated to each other and cannot create reliable welded joint. Thickness of solidify layer for welding is approximately in the range 30-120 microns, depending on the material to be welded (for example ABS 30-70 microns, polypropylene 90-120 microns) For example, it will be very difficult to weld a strip made from nylon to typical extruded tubes, because most extruded tubes are made from polyethylene and/or have a polyethylene outside layer of a multi-layer laminated tube. It will be impossible to create reliable welded joint between nylon and polyethylene, because for common commercial grades of medium- and high-density polyethylene the melting point is typically in the range 120 to 180° C. and the 220° C. is the melting point of nylon 6. Thus, according to the present invention, a reliable welded joint will be created along the entire strip, if strip made from polyethylene (or tube 22 exterior material) because it welds two parts from materials with substantially the same melting point.

By another embodiment strip can by permanently attached to tube surface by using permanent glue, for example Loctite® 5056™ Silicone Adhesive Sealant, a self-leveling/high adhesion, or a UV (ultraviolet) or a visible light curing, noncorrosive silicone with very high bond strength, that may also provide high speed adhesion between the elements 22, 24.

Figure 18:
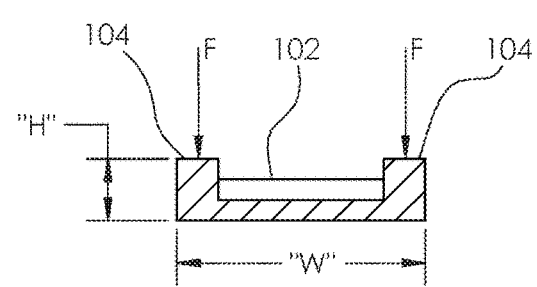
FIG. 18 is a sectional view of strip from FIG. 17.

Strip 24 location on the tube 22 should be precise in relation to the pusher "lip" 74 or 82, and opening W-P, because misalignment between strip teeth 32 and pusher "lip" will cause disengagement of "lip" and teeth and as result pusher will be displaced during squeezing action, e.g. ride on edge ridges 104 of FIG. 18. To ensure precision relation between pusher "lip" and strip during pusher movement forward, pusher has undercut with precision dimensions W-P to strip width. This cut out, with relations to strip width W, will confront and surround pusher during movement. Pusher 70 has an opening for flattened tube sides 22A, 22B.

After the tube has been formed into the desired cylindrical shape and length, the tube is transferred to the heading (a transitional area for the end of the tube 28 to receive a cap) operation. As with plastic tubes, several heading methodologies are available. After the complete tube has been formed, it goes to the capping station where a cap 30 is applied. After tube completely formed with an optional printed outer layer or a painted layer added, it goes to filling station where material 80 added to the tube thru the open end 29 (end without cap) and after this this end welded by using ultrasound welding machine to form the sealed end region 62. Alternate end region 62 sealing technologies that may be used in the present embodiments include hot-air tube sealing, ultrasonic tube sealing, hot-jaw sealing, thermal impulse tube sealing as adapted to the tube end 29 material.

If plastic containers or tubes 22 are used, the manufacturing process is typically composed of four steps: extrusion, heading, decorating, and finally capping. The first phase of the manufacturing process is extrusion. A mixture of resin and color concentrate is placed into an extruder hopper. The extruder is temperature controlled as the resin is fed through to ensure proper melt of the resin. The material is extruded through a set of sizing dies that are encapsulated within a right angle cross section attached to the extruder. Thereafter, the prepared tubular housing members 22 are decorated such as by rotogravure printing.

Figure 5:
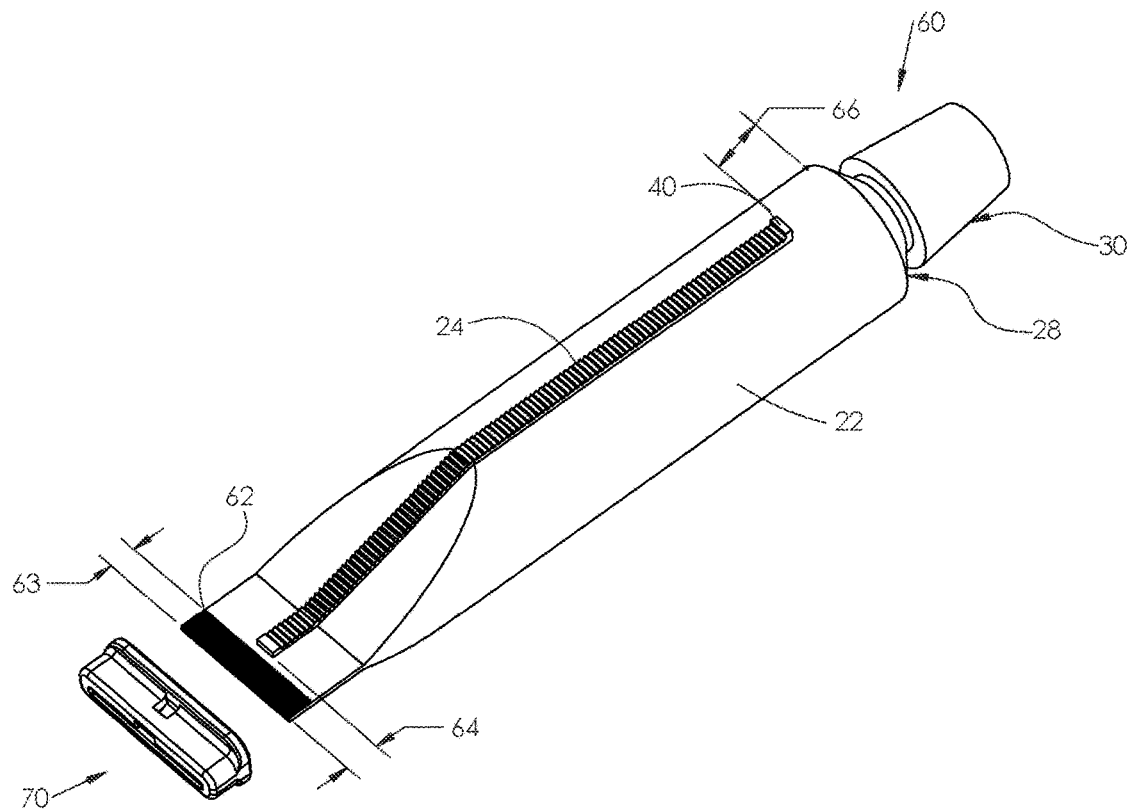
FIG. 5 is an exploded view of one embodiment of the squeezable container assembly.
Figure 6:
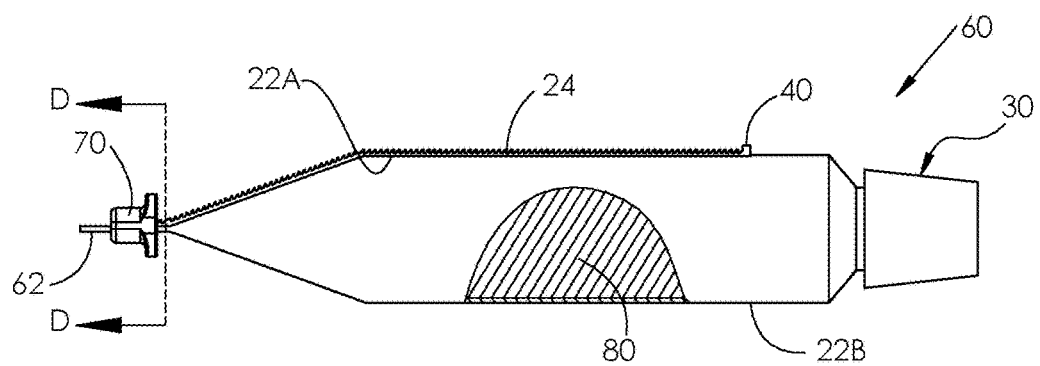
FIG. 6 is a side view partial cutaway of squeezable container assembly of FIG. 5.
Figure 7:
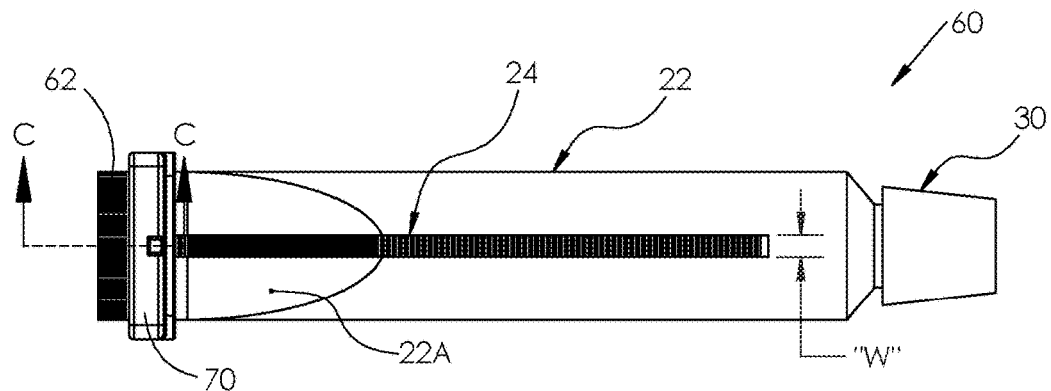
FIG. 7 is a top view of the squeezable container assembly of FIG. 5.

Further assembly of an exemplary embodiment 60 of the present invention is shown in FIG. 5-7, wherein the housing container end 29 (FIG. 1) distal from the cap 30, is externally compressed and joined (e.g. by ultrasonic welding) to form an elongated and flattened terminal strip 62 having a width 63 less than a distance 64 between the end of grooved strip 24 (opposite from the end having stop 40) and the outer end of the strip 62. Grooved strip 24 is attached to the housing container 22 before the contained material (80) is filled into the housing container. The typical average width of the tube end 63 weld is from 0.25" to 0.50" and formed after contained material is filled into the housing container 22. The start location 64 of the strip 24 location on the housing container (relative to the filled end 29) is preferably greater than the dimension of the weld 63 by 50% to avoid any welding heat to undesirably affect the joining of the strip 24 to the body of the housing container 22.

Figure 16:
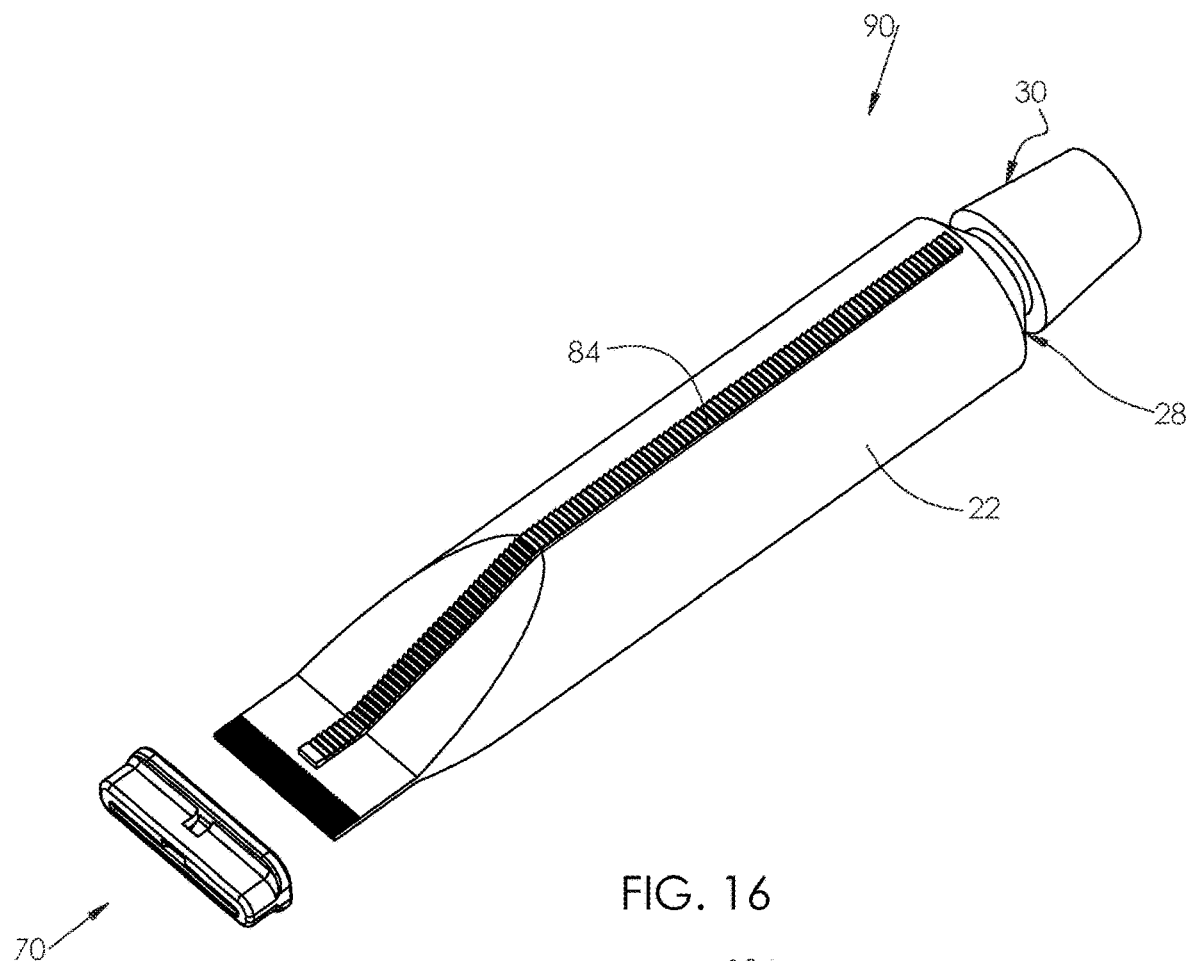
FIG. 16 is an exploded perspective view of container according to one embodiment of the present invention with permanently attached grooved strip having an end stop very dose to the tubular container opening end.

A substantially continuous compression member 70 having an elongated opening sufficient dimension to receive the joined region 62 and housing container sides 22A and 22B therein, and a further expanded opening sufficient to receive the elongated strip 24 thickness dimension (extending away from the housing container sides 22A) in addition to the housing container sides 22A and 22B, as shown in FIGS. 6-9, discussed below. The elongated strip is placed on the housing container 22 having spacing between the stop and the cap 30 end 28 of the housing container of distance 66, preferably 0.5" to 1.0", to accommodate the majority of finger sizes to allow a comfortable squeezing action on the housing container providing enhanced user control of the present apparatus to fully expel the contents 80. An alternate embodiment is shown in FIG. 16 wherein the strip 84 extends substantially the length of the container 22.

A fluid or semi-fluid (e.g. a 'cream'-like or 'paste' like) substance or material 80 is contained within the container 22 having sides 22A and 22B, and between the cap 30 opening and sealed opposite end 29, and is advanced through the cap 30 (when opened) by incremental advancement of the compression member 70 from the strip 62 end 29 along the length of the housing container 22 toward the end 28 by user manipulation, until the compression member 70 abuts the stop 40. Further compression may be applied across the housing container 22 diameter by the user in the region 66 between the stop 40 and cap 30 end 28.

Figure 8:
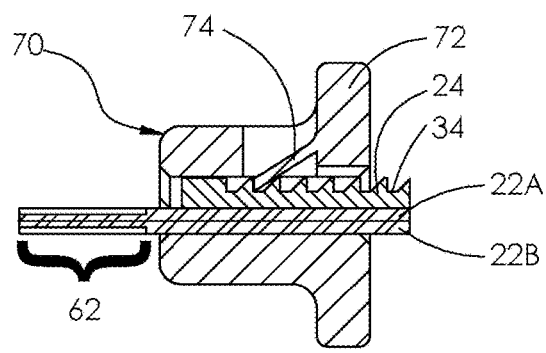
FIG. 8 is a sectional view C-C taken of the squeezable container assembly of FIG. 7 with the compression device located in the 'full' container position.
Figure 9:
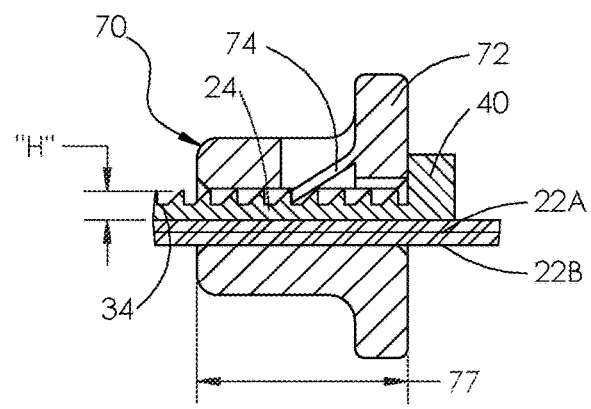
FIG. 9 is a sectional view C-C taken of the squeezable container assembly of FIG. 7, with the compression device located in a 'empty' position, engaging a stop.
Figure 12:
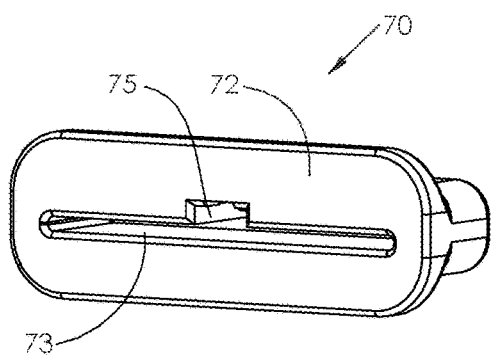
FIG. 12 is an isometric view of pusher.

Cross-sectional views of the compression member 70 as applied on the housing container at an end of the elongated strip 24 proximal the joined strip 62 and the stop 40 are shown in FIGS. 8 and 9, respectively, wherein the compression member applies a force against the two opposing sides 22A, 22B of the housing container 22 as the compression member is advanced, resulting in a flattened area over which the compression member 70 may continue to be advanced toward the stop 40. In one embodiment, the compression member includes a flange 72, or 'pusher', to receive a user-applied force to urge the compression member toward the stop 40, and to further reinforce the dimensional shape and opening spacing of the compression member 70 as it receives resistance from evacuation of the contained material 80. To prevent reversal in direction along the elongated strip, a unidirectional (along the strip 24) gripping member, e.g. a downward-angled protrusion 74, biased to engage the grooves 34 (or other profile) on the surface in a direction opposing compression member 70 motion away from the stop by engagement of the grooves 34, to permit motion toward the stop 40 by sliding over the walls of the grooves (or other elongated strip protrusions). In the exemplary embodiment, the compression member 70 ultimately comes to rest on the stop 40, and the remaining housing container 22 surfaces may be further compressed by the user as desired without encumbrance from the elongated strip 24. In an embodiment, the movement of compression member 70 protrusion along the elongated strip 24 grooves 34 produces a discernable (e.g. tactile) 'click' to the user. In the exemplary embodiments "H" is a high of the strip 24, and "H-P" is a high of pusher cut out 75 (FIG. 12) to receive strip 24 when on the container 22, and is typically larger than "H" to allow pusher forward movement without interference with strip, preferably between 0.005" to 0.015"

Figure 10:
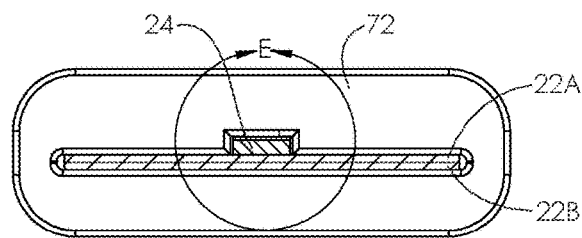
FIG. 10 is a sectional view D-D taken of FIG. 6.

The cross section D-D taken from FIG. 6 is shown on FIG. 10, having width "S" (shown on FIG. 13) of the pusher 72 opening, should be larger than width of flat, compressed tube body, to allow a forward movement of the pusher 72. Preferably, opening 73 (FIG. 12) dimension "S" should be bigger than flattened tube (22) width in the range +0.005" to +0.010". As it shown on the same FIG. 10 and FIG. 13 heights of the pusher 72 opening "T" should be bigger than sum of two-wall thickness of the tube wall. Pusher opening dimension "T" should allow forward movement of the pusher 72 and the same time allow squeezing forward material inside the tube. Optimum range of this gap should be in the range of +0.005" to +0.010" and this gap depending of density of material inside the tube.

Figure 11:
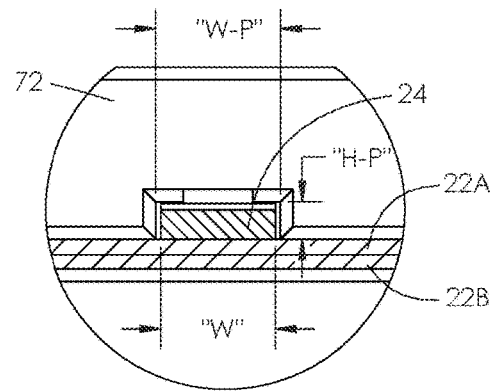
FIG. 11 is an enlarged view E taken of FIG. 10.
Figure 13:
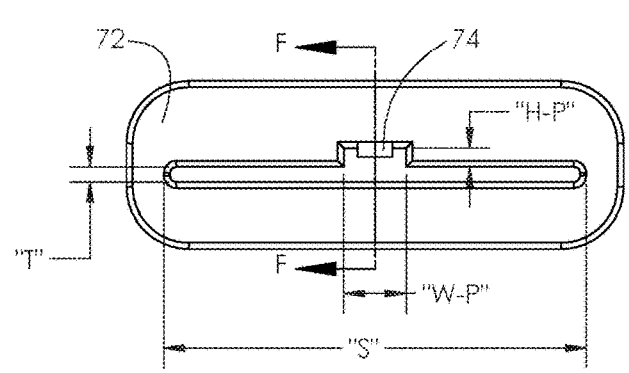
FIG. 13 is a frontal view of pusher.

As it shown on FIG. 11 and FIG. 13, the width of pusher 72 cut out opening "W-P" for toothed strip 72 should be larger than width "W" of the toothed strip, to allow pusher 72 forward movement. It should be reliable engagement pusher 72 lip 74 with toothed profile of the strip 24 and prevent pusher movement backwards during squeezing material from the tube, lip 74 and toothed profile of the strip 24 must be align. To ensure this dimension "W-P" of the pusher should be bigger than toothed strip width "W" in the range 0.003" to 0.005", but this can be different depends of toothed strip profile dimensions. In the embodiment shown in FIGS. 9 and 12, the compression member 70 extends a length distance 77 along the strip 24 together with the cut out 75, guides the compression member 70 movement along the body of the housing container 22. Length distance 77 can vary like for small size of containers 22 distance (size) 77 can be as small as ⅛" and for larger containers can be up to ¾".

Figure 14:
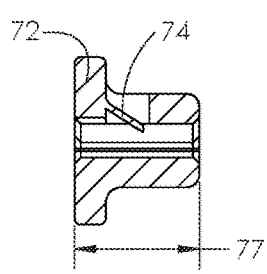
FIG. 14 is a sectional view F-F taken from FIG. 13 when pusher "lip" 74 is fabricated (molded) from same plastic material as a pusher.
Figure 15:
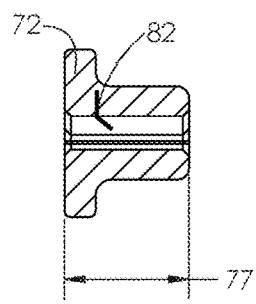
FIG. 15 is a sectional view F-F taken from FIG. 13 when pusher "lip" 82 made from flexible metal, inserted into the pusher or over molded.

FIG. 14, shows pusher 72 cross sectional view, where lip 74 for engagement with toothed profile of the strip 24 is fabricated from same material as a pusher, e.g. by injection molding. The pusher can be made from different plastic materials such as ABS, nylon, polypropylene etc. This pusher can work well with relatively small size of tubes or with tube consist a low density materials, because squeezing out material from those tubes does not required a big force and pusher lip made from plastic can hold this load. But if size of tube is large and tube consist hi density material it required larger force to squeeze out material from the tube. As it shown on FIG. 15 pusher 72 lip 82 made from stronger material than pusher body and this lip 82 material can be metal. This pusher with metal lip can be fabricated by over molding process or lip 82 can be pressed into the pusher body 72.

Figure 17:
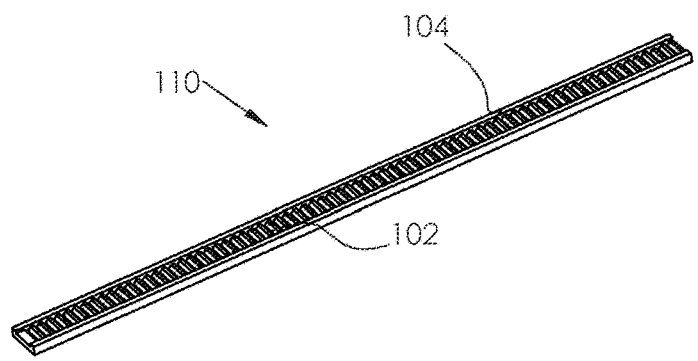
FIG. 17 is an isometric view of the toothed strip by another embodiment.

An alternate embodiment of the elongated strip 110 is shown in FIGS. 17 and 18, wherein the raised teeth 102 are bounded by elevated edges 104 which are adapted to receive a compression force F to urge the elongated strip into contact with the container 22 surface during the bonding (e.g. ultrasonic welding) process.

These and further modifications and substitutions by one of ordinary skill in the art are within the scope of the present invention, which is not limited except by the claims that follow.

What is claimed is:

1. A dispensing container, comprising:
a housing enclosing a volume and comprising:
a length with a first end and a second end, and an outer layer;
a strip of a single material attached to said housing outer layer by a permanent adhesive therebetween and disposed in position on said housing in a region along said housing length; and
a compression member engaging the housing and the strip and movable along the housing length to provide a compressive force to selectively reduce said housing volume, wherein the compression member comprises an aperture configured to receive the housing and the strip to guide the compression member along the housing length, and wherein the aperture comprises a strip aperture portion for receiving the strip, and wherein the strip further comprises a stop element that comprises a dimension greater than the strip aperture portion of the compression member.

2. The dispensing container of claim 1, wherein the strip is bonded to outer surface of the housing by at least one of:
(a) visible light activated permanent adhesive; or
(b) ultraviolet light activated permanent adhesive.

3. A collapsible container comprising:
an outer surface that encloses a volume;
an elongated strip bonded to the outer surface by a permanent adhesive; and
a compression member, that is configured to move in a direction that is parallel to a direction defined by the elongation of the strip, wherein the movement of the compression member selectively reduces the volume enclosed by the outer surface, wherein the compression member comprises an aperture configured to receive the outer surface and the strip to guide the compression member in the direction that is parallel to the direction defined by the elongation of the strip, and wherein the aperture comprises a strip aperture portion for receiving the elongated strip, and wherein the elongated strip further comprises a stop element that comprises a dimension greater than the strip aperture portion of the compression member.

4. The collapsible container of claim 3, wherein the outer surface and the strip comprise material types compatible with the bonding by the permanent adhesive.

5. The collapsible container of claim 3, where the strip comprises flexible material.

6. The collapsible container of claim 3, wherein the elongated strip comprises at least one of: (a) a plurality of teeth, and (b) a set of groves, configured to engage with the compression member.

7. The collapsible container of claim 6, wherein the compression member comprises an extended lip configured to engage with the at least one of: (a) the plurality of teeth, and (b) the set of groves, and wherein the extended lip comprises a material that is stronger than other materials of the compression member.

8. The collapsible container of claim 3, wherein the strip is bonded to the outer surface by visible light activated permanent adhesive.

9. The collapsible container of claim 8, wherein the strip is transparent to visible light.

10. The collapsible container of claim 3, wherein the strip is bonded to the outer surface by ultraviolet light activated permanent adhesive.

11. The collapsible container of claim 10, wherein the strip is transparent to ultraviolet light.

12. The collapsible container of claim 3, wherein the strip is bonded to the outer surface by non-corrosive silicon-based permanent adhesive.

13. The collapsible container of claim 3, wherein
the strip comprises a thickness dimension extending away from the outer surface; and
the compression member includes an aperture dimensioned to receive collapsed outer surface therethrough and an elongated strip aperture dimensioned to further receive the elongated strip therethrough.

14. The collapsible container of claim 13, wherein the compression member further comprises a strip engagement member disposed within the elongated strip aperture to engage the elongated strip to permit a single direction movement therealong.

15. The collapsible container of claim 3, wherein
the outer surface comprises a sealed end region, and
the compression member comprises an aperture dimensioned to receive the sealed end region therethrough and a region within said aperture of greater dimension to receive the elongated strip therethough.

16. The collapsible container of claim 3, wherein the outer surface comprises a region prepared to facilitate bonding of the elongated strip to the outer surface by the permanent adhesive.

17. The collapsible container of claim 3, wherein a surface of the elongated strip comprises varied portions.

* * * * *